United States Patent
Yang et al.

(10) Patent No.: US 10,400,573 B2
(45) Date of Patent: Sep. 3, 2019

(54) SYSTEM AND METHOD FOR CONTROLLING DRILLING PROCESS

(71) Applicant: Schlumberger Technology Corporation, Sugar Land, TX (US)

(72) Inventors: CuiLi Yang, Bellevue, WA (US); James P. Belaskie, Missouri City, TX (US); Jose Luis Sanchez Flores, Austin, TX (US); Richard Harmer, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 836 days.

(21) Appl. No.: 14/765,857

(22) PCT Filed: Feb. 5, 2013

(86) PCT No.: PCT/CN2013/071407
§ 371 (c)(1),
(2) Date: Aug. 5, 2015

(87) PCT Pub. No.: WO2014/121448
PCT Pub. Date: Aug. 14, 2014

(65) Prior Publication Data
US 2015/0369031 A1  Dec. 24, 2015

(51) Int. Cl.
*E21B 4/02* (2006.01)
*E21B 7/06* (2006.01)
(Continued)

(52) U.S. Cl.
CPC .............. *E21B 44/04* (2013.01); *E21B 4/02* (2013.01); *E21B 7/06* (2013.01); *E21B 44/00* (2013.01); *G05B 13/041* (2013.01)

(58) Field of Classification Search
CPC ... E21B 44/04; E21B 4/02; E21B 7/06; E21B 44/00; G05B 13/041
See application file for complete search history.

(56) References Cited

U.S. PATENT DOCUMENTS

| 4,845,628 A | 7/1989 | Gray et al. |
| 7,128,167 B2 | 10/2006 | Dunlop et al. |

(Continued)

FOREIGN PATENT DOCUMENTS

| AU | 4442472 A | 1/1974 |
| CN | 102822752 A | 12/2012 |

(Continued)

OTHER PUBLICATIONS

International Search Report for International Application No. PCT/CN2013/071407 dated Nov. 14, 2013.
Detournay, et al. "Drilling Response of drag bits: Theory and Experiment," International Journal of Rock Mechanics & Mining Sciences 45 (2008): 1347-1360.
(Continued)

*Primary Examiner* — Rehana Perveen
*Assistant Examiner* — Steven W Crabb
(74) *Attorney, Agent, or Firm* — Alec J. McGinn

(57) ABSTRACT

Techniques for optimizing automated drilling processes are disclosed. Such techniques include modeling a formation and selecting a drilling trajectory in the formation. Measurements of rate of penetration (ROP), revolutions per minute (RPM), weight-on-bit (WOB) and torque-on-bit (TOB) of a drilling string at a position on the drilling trajectory in the formation are received. A functional relationship between depth of cut (DOC), WOB, and TOB for the modeled formation is determined. Operating constraints defining a safe operating envelope as a function of RPM and WOB along the selected drilling trajectory are determined, and an optimal RPM and WOB is determined based on operating constraints. A cost function of RPM and WOB is determined, and a path from current RPM and WOB to optimal RPM and WOB is determined based on the cost function.

20 Claims, 11 Drawing Sheets

(51) Int. Cl.
*E21B 44/00* (2006.01)
*E21B 44/04* (2006.01)
*G05B 13/04* (2006.01)

(56) References Cited

U.S. PATENT DOCUMENTS

| | | | |
|---|---|---|---|
| 8,301,382 B2 | 10/2012 | Herrera | |
| 9,388,680 B2* | 7/2016 | Moran | E21B 44/00 |
| 2004/0256152 A1 | 12/2004 | Dashevskiy et al. | |
| 2010/0259415 A1* | 10/2010 | Strachan | E21B 44/00 |
| | | | 340/853.6 |
| 2011/0186353 A1* | 8/2011 | Turner | G05B 13/048 |
| | | | 175/40 |
| 2011/0220410 A1 | 9/2011 | Aldred et al. | |
| 2014/0231141 A1* | 8/2014 | Hay | E21B 44/00 |
| | | | 175/45 |
| 2015/0252664 A1* | 9/2015 | Astrid | E21B 44/04 |
| | | | 700/275 |

FOREIGN PATENT DOCUMENTS

| | | |
|---|---|---|
| EP | 1193366 A2 | 4/2002 |
| WO | 2014121448 A | 8/2014 |

OTHER PUBLICATIONS

Office Action issued in related EP application 13874508.8 dated Jun. 10, 2016, 7 pages.
European Search Report issued in European Patent Application No. 13874508.8 dated Jan. 19, 2016; 4 pages.

* cited by examiner

SYSTEM AND METHOD FOR CONTROLLING DRILLING PROCESS

BACKGROUND

The present disclosure relates generally to process automation, and more particularly to automatic control of a drilling apparatus.

In the hydrocarbon industry, the process of drilling into a hydrocarbon reservoir may be impeded by a wide variety of problems and may require monitoring/interpretation of a considerable amount of data. Accurate measurements of down hole conditions, down hole equipment properties, geological properties, rock properties, drilling equipment properties, fluid properties, surface equipment properties and/or the like may be analyzed by a drilling crew to minimize drilling risks, to make determinations as to how to optimize the drilling procedure given the data and/or to detect/predict the likelihood of a problem/decrease in drilling efficiency and/or the like.

Similarly, in hydrocarbon exploration, hydrocarbon extraction, hydrocarbon production, hydrocarbon transportation and/or the like, many conditions may be sensed and data gathered to provide for optimizing and/or preventing/mitigating issues/problems concerning the exploration, production and/or transportation of hydrocarbons. Hydrocarbons are essentially a lifeblood of the modern industrial society, as such vast amounts of hydrocarbons are being prospected, retrieved and transported on a daily basis. Associated with this industry are an enormous amount of sensors gathering enumerable amounts of data relevant to the exploration, production and or transportation of hydrocarbons.

Accurate analysis of operating conditions may allow for an operator to operate the industrial process at near optimal conditions. For example, in the hydrocarbon industry, the bit-response to changes in parameters such as drill-bit rotational speed and weight-on-bit (WOB) while drilling into a hydrocarbon reservoir is very much affected by changes in the lithological environment of drilling operations. Accurate and real-time knowledge of a transition from one environment to another, e.g., one formation to another, and real-time analysis of how such environmental conditions impact the effect that parameter changes are likely to have on bit-response may greatly improve the expected rate of penetration (ROP). Such analysis and modeling is described in U.S. Patent Application No. 2011/0220410 incorporated in its entirety by reference herein.

With regard to the hydrocarbon industry, some techniques have been used for detecting a certain type of event, i.e., possible rig states, such as "in slips", "not in slips", "tripping in" or "tripping out". These systems take a small set of rig states, where each rig state is an intentional drilling state, and use probability analysis to retroactively determine which of the set of intentional drilling states the rig has moved into. Probabilistic rig state detection is described in U.S. Pat. No. 7,128,167, the entirety of which is hereby incorporated by reference for all purposes.

In the hydrocarbon industry, there are ever more and better sensors for sensing data related to the exploration, extraction, production and/or transportation of the hydrocarbons. Use of the sensed data to better control/automate processes to the drilling of wellbores would be desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In accordance with an embodiment, there is described a method for optimizing an automated drilling apparatus. The method includes modeling a formation and selecting a drilling trajectory in the formation. Measurements are received indicative of rate of penetration (ROP), revolutions per minute (RPM), weight-on-bit (WOB) and torque-on-bit (TOB) of a drilling string at a position on the drilling trajectory in the formation. A functional relationship between DOC, WOB, and TOB for the given formation being drilled is computed. Operating constraints defining a safe operating envelope as a function of RPM and WOB is then determined. A second functional relationship defining cost as a function of RPM and WOB is specified, wherein the cost function encompasses a plurality of desirable drilling responses. An optimal WOB and RPM are computed for the formation being drilled. Determination of a minimum cost path from the current WOB/RPM to the optimal is computed using the cost function, and the drilling parameters are controlled such that WOB and RPM is adjusted to the optimal WOB and RPM.

In accordance with another embodiment, there is provided a computer program product having a computer readable program code embodied therein. The computer readable program code contains instructions for causing a computer processor to model a formation and select a drilling trajectory in the formation. Measurements are received indicative of depth-of-cut (DOC), revolutions per minute (RPM), weight-on-bit (WOB) and torque-on-bit (TOB) of a drilling string at a position on the drilling trajectory. A first functional relationship between depth of cut (DOC) and WOB at the position on the drilling trajectory in the modeled formation is determined. Operating constraints defining a safe operating envelope as a function of RPM and WOB at the position on the drilling trajectory are determined A cost relationship as a function of RPM and WOB at the position on the drilling trajectory is determined. An optimal RPM and an optimal WOB based on the cost relationship within the safe operating envelope at the position on the drilling trajectory is determined and, thereafter, the RPM and WOB are adjusted to the optimal RPM and WOB of the drilling string at the position on the drilling trajectory.

In accordance with a further embodiment, a system for modeling a formation drilling response is provided. A plurality of sensors that measure depth-of-cut, weight-on-bit (WOB) and torque on bit (TOB) at a plurality of positions on the drilling trajectory are provided. A processor is provided for determining a functional relationship between DOC, WOB and TOB for the given formation being drilled at the plurality of positions on the drilling trajectory. The processor determines operating constraints defining a safe operating envelope as a function of RPM and WOB at the plurality of positions on the drilling trajectory and determines a second functional relationship defining a cost as a function of RPM and WOB at the plurality of positions on the drilling trajectory. The cost function encompasses a plurality of desirable drilling responses. An optimal WOB and RPM are computed for the formation being drilled at the plurality of positions on the drilling trajectory. The RPM and/or WOB are controlled along a path to minimize the cost function at any of the plurality of positions on the drilling trajectory based on the second functional relationship

BRIEF DESCRIPTION OF THE FIGURES

The accompanying drawings, which are incorporated in and constitute a part of this specification, illustrate several embodiments of the present teachings and together with the description, serve to explain the principles of the present teachings.

Figure 1:
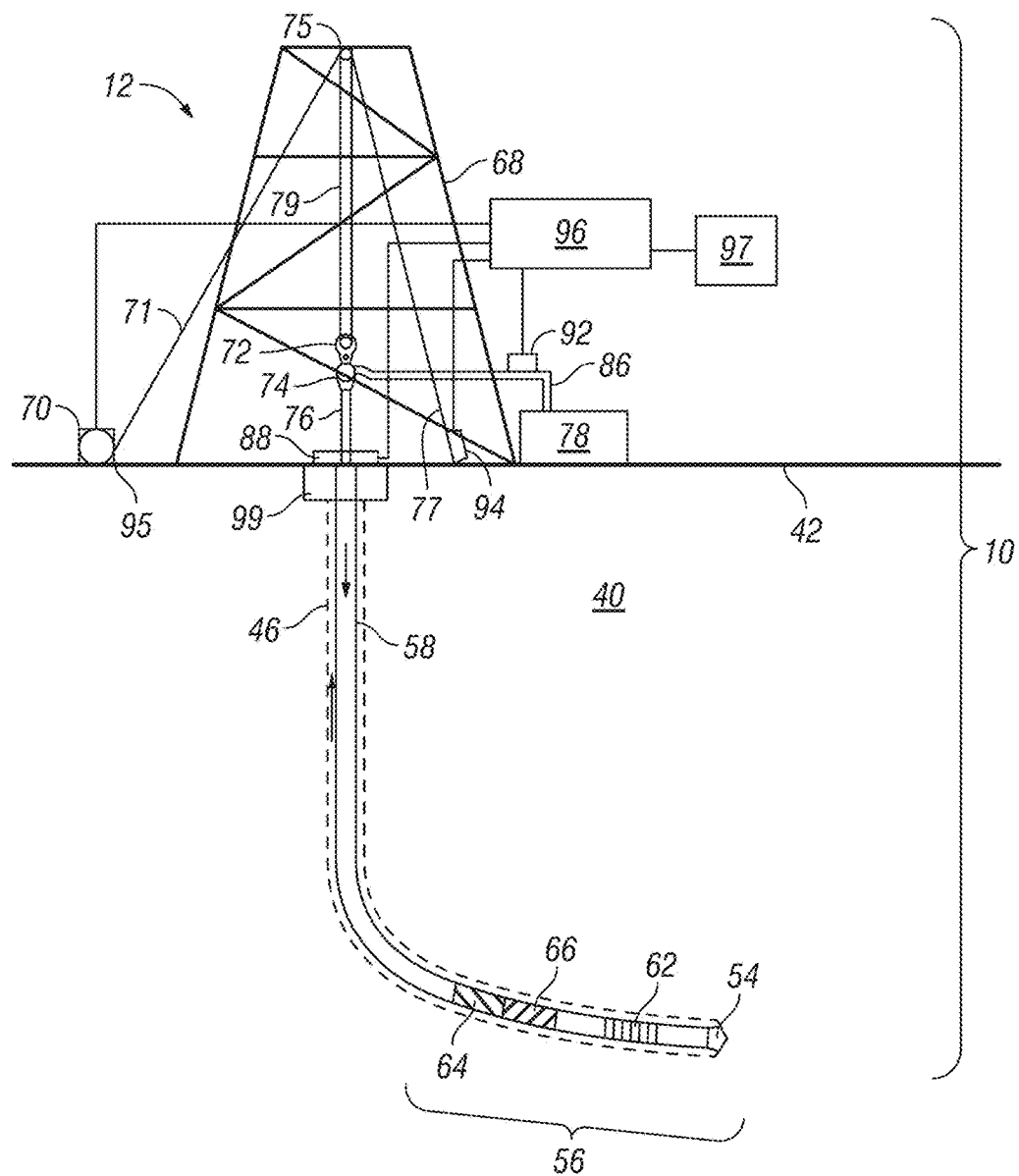
FIG. 1 is a schematic diagram illustrating a drilling system including an online automation/control system, in accordance with an embodiment of the present disclosure.

It should be noted that some details of these figures have been simplified and are drawn to facilitate understanding of the embodiments rather than to maintain strict structural accuracy, detail, and scale.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

It should also be noted that in the description provided herein, computer software is described as performing certain tasks. Furthermore, while the description provides for embodiments with particular arrangements of computer processors and peripheral devices, there is virtually no limit to alternative arrangements, for example, multiple processors, distributed computing environments, web-based computing, and so forth. All such alternatives are to be considered equivalent to those described and claimed herein.

In this disclosure, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

FIG. 1 shows a drilling system 10, according to embodiments of the present invention. As depicted, a drill string 58 is shown within a borehole 46. The borehole 46 is located in the earth 40 having a surface 42. The borehole 46 is being cut by the action of a drill bit 54. The drill bit 54 is disposed at the far end of the bottom hole assembly 56 that is itself attached to and forms the lower portion of the drill string 58.

The bottom hole assembly 56 contains a number of devices including various subassemblies. According to an embodiment of the present invention, measurement-while-drilling (MWD) subassemblies may be included in subassemblies 62. Examples of typical MWD measurements include direction, inclination, survey data, down hole pressure (inside the drill pipe, and outside or annular pressure), resistivity, density, and porosity. The subassemblies 62 may also include a subassembly for measuring torque and weight on bit.

The subassemblies 62 may generate signals related to the measurements made by the subassemblies 62. The signals from the subassemblies 62 may be processed in processor 66. After processing, the information from processor 66 may be communicated to communication assembly 64. The communication assembly 64 may comprise a pulser, a signal processor, an acoustic processor and/or the like. The communication assembly 64 converts the information from processor 66 into signals that may be communicated as pressure pulses in the drilling fluid, as signals for communication through an optic fiber, a wire and/or the like, or signals for wireless or acoustic communication and/or the like.

The subassemblies in the bottom hole assembly 56 can also include a turbine or mud motor for providing power for rotating and steering drill bit 54. In different embodiments, other telemetry systems, such as wired pipe, fiber optic systems, acoustic systems, and wireless communication systems, may be used to transmit data to the surface system.

The drilling rig 12 includes a derrick 68 and hoisting system, a rotating system, and a mud circulation system. The hoisting system, which suspends the drill string 58, includes draw works 70, fast line 71, crown block 75, drilling line 79, traveling block and hook 72, swivel 74, and deadline 77. The rotating system includes kelly 76, rotary table 88, and engines (not shown). The rotating system imparts a rotational force on the drill string 58 as is well known in the art. Although a system with a kelly and rotary table is shown in FIG. 1, those of skill in the art will recognize that the present invention is also applicable to top drive drilling arrangements. Although the drilling system is shown in FIG. 1 as being on land, those of skill in the art will recognize that the present invention is equally applicable to marine environments.

The mud circulation system pumps drilling fluid down the central opening in the drill string. The drilling fluid is often called mud, and it is typically a mixture of water or diesel fuel, special clays, and other chemicals. The drilling mud is stored in mud pit 78. The drilling mud is drawn in to mud pumps (not shown), which pump the mud through stand pipe 86 and into the kelly 76 through swivel 74 which contains a rotating seal.

The mud passes through drill string 58 and through drill bit 54. As the teeth of the drill bit grind and gouge the earth formation into cuttings, the mud is ejected out of openings or nozzles in the bit with great speed and pressure. These jets of mud lift the cuttings off the bottom of the hole and away from the bit 54, and up towards the surface in the annular space between drill string 58 and the wall of borehole 46.

At the surface, the mud and cuttings leave the well through a side outlet in blowout preventer 99 and through mud return line (not shown). Blowout preventer 99 may include a pressure control device and a rotary seal. The mud return line feeds the mud into separator (not shown) which separates the mud from the cuttings. From the separator, the mud is returned to mud pit 78 for storage and re-use.

Various sensors, as are known in the art, may be placed on the drilling rig 10 to take measurements of the drilling equipment. In particular, hook load is measured by hook load sensor 94 mounted on deadline 77, block position and the related block velocity are measured by block sensor 95 which is part of the draw works 70. Surface torque is measured by a sensor on the rotary table 88. Standpipe pressure is measured by pressure sensor 92, located on standpipe 86. Additional sensors may be used to detect whether the drill bit 54 is on bottom. Signals from these measurements are communicated to a central surface processing system 96.

Mud pulses traveling up the drill string may be detected using pressure sensor 92. For instance, pressure sensor 92 may include a transducer that converts the mud pressure into electronic signals. In the illustrated embodiment, the pressure sensor 92 is connected to surface processing system 96 that converts the signal from the pressure signal into digital form, and stores and demodulates the digital signal into useable MWD data. In one embodiment, the surface processing system 96 is programmed to automatically detect the most likely rig state based on the various input channels described. Processing system 96 is also programmed to carry out the automated event detection. Further, processing system 96 may transmit the rig state and/or event detection information to user interface system 97, which is designed to warn the drilling personnel of undesirable events and/or suggest activity to the drilling personnel to avoid undesirable events. In other embodiments, interface system 97 may output a status of drilling operations to a user (e.g., via a user interface as part of a software application), and the user may manage the drilling operations using the indicated status.

Processing system 96 may be further programmed, as described below, to interpret the data collected by the various sensors provided to provide an interpretation in terms of activities that may have occurred in producing the collected data. Such interpretation may be used to understand the activities of a driller, to automate particular tasks of a driller, to provide suggested course(s) of action such as parameter setting, to provide training for drillers, and so forth.

In the hydrocarbon industry it is often desirable to automate, or at least semi-automate operations to remove or mitigate human error, to increase speed and/or efficiency, allow for remote operation or control, to lessen communication obstacles, and so forth. Moreover, in the hydrocarbon industry, sensors are commonly deployed to gather data to provide for monitoring and control of the systems related to hydrocarbon capture.

In the process of drilling a borehole, one or more sensors are typically used to monitor the drilling process (e.g., including the functioning of the drilling components, the state of drilling fluids in the borehole, the drilling trajectory, etc.), characterize the earth formation around or in front of the location being drilled, monitor properties of a hydrocarbon reservoir or water reservoir proximal to the borehole or drilling location and/or the like.

To analyze the multitude of data that may be sensed during the drilling process, averaging techniques have often been used to make statistical assumptions from the data. Such averaging analysis may involve sampling sensed data periodically and then statistically analyzing the periodic data, which is in effect a looking backwards type analysis. Averaging may also involve taking frequent or continuous data and making assessments from averages and/or trends in the data.

Most analysis of data captured in the hydrocarbon industry is moving window analysis, i.e., a window of data is analyzed using the same assumptions and as a whole without consideration as to whether a change has occurred requiring separate analysis of different portions of the window of data. If small data windows are selected to try and avoid/mitigate the effect of changes on the data being analyzed, the small windows often give rise to large amounts of "noise" in the data. To avoid this moving window problem, filtering (e.g., Kalman filters) may be used. However, such filters can only smooth out effects of changes, especially abrupt changes, on the data, and may not necessarily provide for accurate analysis of essentially steady state data in which changes are not occurring. In accordance with certain embodiments, real-time analysis of the data may be provided by identifying and/or processing change points in the data.

Figure 2:
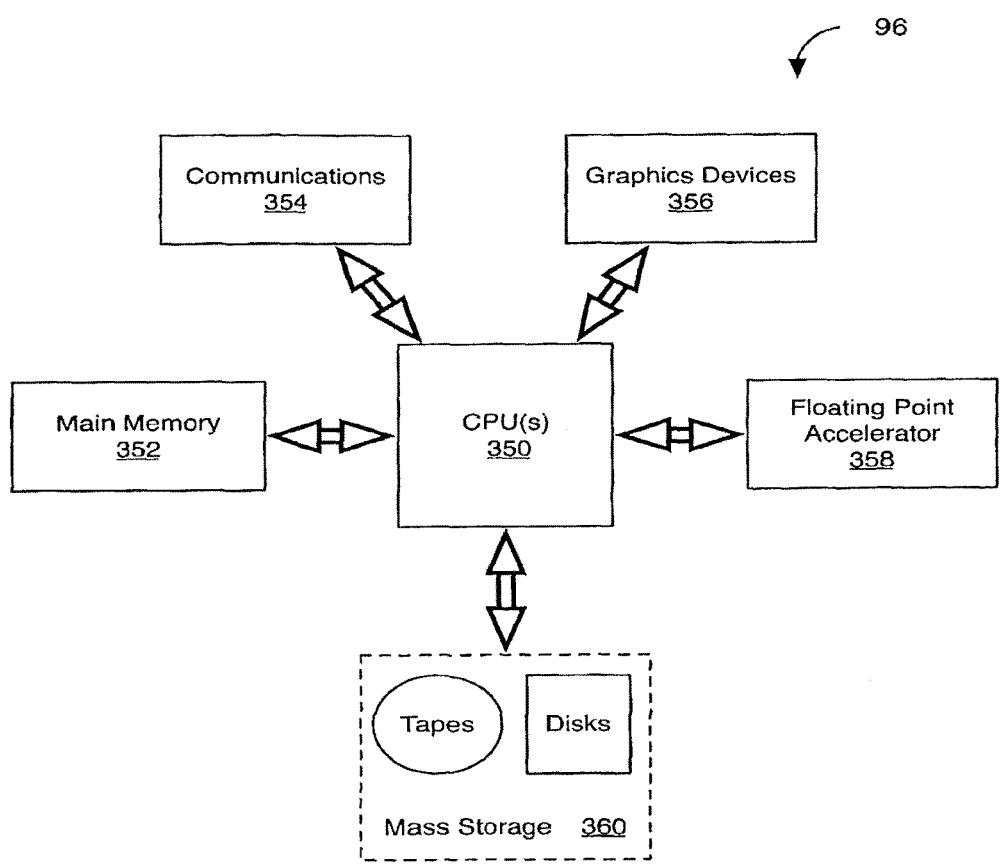
FIG. 2 shows detail of a processing system for processing data to automate hydrocarbon processes, for example, oilfield drilling processes as shown in FIG. 1, according to one embodiment of the present disclosure.

FIG. 2 shows further detail of processing system 96, according to an embodiment. Processing system 96 may include one or more central processing units (CPUs) 350, main memory 352, communications or I/O modules 354, graphics devices 356, a floating point accelerator 358, and mass storage such as tapes and discs 360. It should be noted that while processing system 96 is illustrated as being part of the drill site apparatus, it may also be located, for example, in an exploration company data center or headquarters. It should be noted that many alternative architectures for processing system 96 are possible and that the functionality described herein may be distributed over multiple processors. All such alternatives are considered equivalents to the architecture illustrated and described here.

As will be appreciated, data collected by various sensors in industrial processes often include some degree of noise. Unfortunately, the presence of such noise in the data may make real-time human interpretation of the data difficult. Furthermore, calculations based on individual data points may amplify the effect of the noise (e.g., gains added to the data signal may amplify noise proportionally).

In accordance with aspects of the present disclosure, the well path or trajectory is selected based on a geomechanical model. As described in U.S. patent application Ser. No. 12/412,842, which is incorporated by reference herein in its entirety, one embodiment for selecting a stable well path involves an iterative method where reachable stable positions are constrained by the boundary volume of the formation and the geological modeling data. In accordance with embodiments of the present disclosure, after a well path or trajectory is selected, drilling conditions are optimized based on data supplied during drilling.

Figure 3:
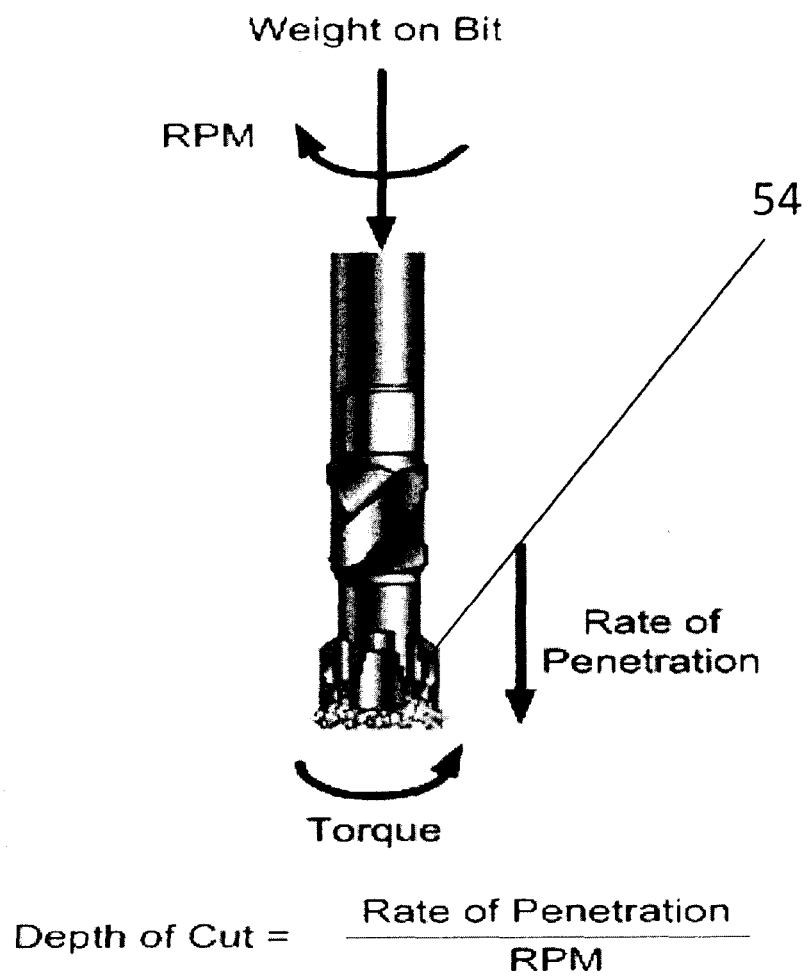
FIG. 3 shows the relationship between weight-on-bit (WOB), depth-of-cut (DOC), rate-of-penetration (ROP) and drill-bit-rotational speed in rotations-per-minute (RPM) on a drill string.

Described in the above-referenced U.S. Patent Application 2011/0220410 are methods to provide better models of a formation and the use of those models to control the drilling parameters. The bit response of a drilling bit (typically Polycrystalline Diamond Compact or PDC) in the three-dimensional space defined by weight-on-bit ("WOB"), depth-of-cut ("DOC"), and torque-on bit (TOB) is described. DOC is determined by dividing the rate-of-penetration (ROP) of the drill bit by the RPM of the drill bit, as shown in FIG. 3. The expected bit response in that space is described in Detournay, Emmanuel, Thomas et al., "Drilling Response of Dragbits: Theory and Experiment," International Journal of Rock Mechanics & Mining Sciences 45 (2008): 1347-1360. The bit response tends to have multiple phases with respect to the WOB applied, wherein each phase has a relatively linear bit response.

In a first phase, with low WOB applied, very low depth of cut is achieved. At low WOB, most of the interaction between the bit 54 (FIG. 1 and FIG. 3) and rock occurs at the wear flats on the cutters. Neither the rock surface nor the wear flat will be perfectly smooth, so as depth of cut increases, the rock beneath the contact area will fail and the contact area will enlarge. This continues until a critical depth of cut where the failed rock fully conforms to the geometry of the wear flats and the contact area grows no larger. Next, a second phase corresponds to an intermediate amount of WOB. In this second phase, beyond a critical depth of cut, any increase in WOB translates into pure cutting action.

The bit incrementally behaves as a perfectly sharp bit until the cutters are completely buried in the rock and the founder point is reached. The third phase is similar to the initial phase in that little is gained from additional WOB. The response past the founder point depends on how quickly the excess WOB is applied. Applied rapidly, the uncut rock ahead of the cutters will contact with the matrix body of the bit and act in a similar manner to the wear flats in the initial phase, so depth of cut will increase slightly with increasing WOB. Applied slowly, the cuttings may become trapped between the matrix and the uncut rock, so depth of cut may decrease with increasing WOB. In practice, drillers may prefer to operate near the top of the second phase with the optimal depth of cut achieved without wasting additional WOB.

Figure 4:
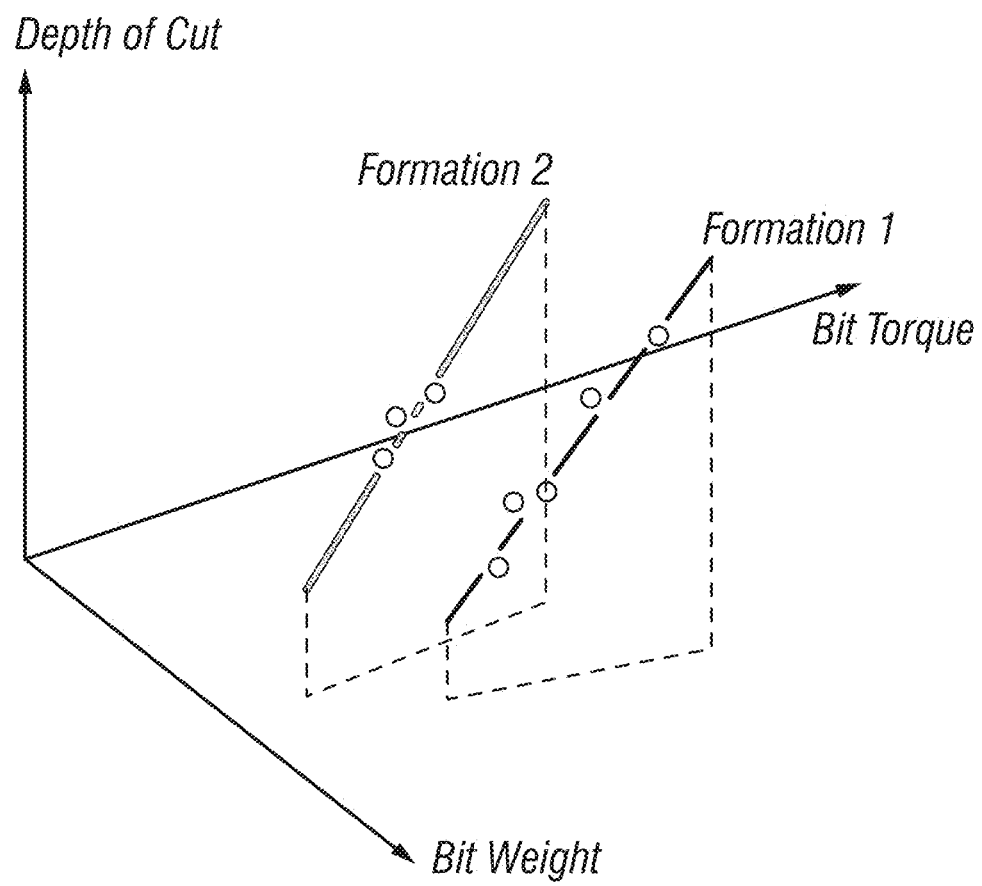
FIG. 4 is an exemplary three-axis diagram showing the performance of a drill in a formation based on WOB, DOC and TOB.
Figure 4:
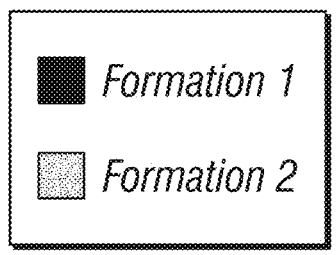

Referring still to FIG. 3, a drill bit 54 is shown. As stated above, DOC per revolution can be estimated by dividing ROP by the RPM) of the drill bit. After determining the DOC and using real-time drilling data TOB (referred to as bit torque in FIG. 4) and WOB (referred to as bit weight in FIG. 4) one can plot a three dimensional representation as shown in FIG. 4. As the bit drills into a new formation, the response will change abruptly and the points will fall on a new line as shown in FIG. 4.

The straight lines in three dimensions in FIG. 4 have four unknown parameters, two slopes and the intersection with the x-y plane, i.e., WOB-torque plane in this case. These parameters can be estimated with a least squares fit to a temporal or spatial sliding window, e.g., last five minutes or last ten feet of data, but this would provide relatively poor fits in the vicinity of formation boundaries.

The PDC bit models have successfully been applied in the field by manual inspection of the data and breaking of such data into homogeneous segments, thereby avoiding the cross-class polluted estimates produced by a moving window. Accordingly, the three-axis diagram in FIG. 4 is intended to show the performance of a drill in a formation based on WOB, DOC and TOB. Each formation (Formation 1 and Formation 2) provides different drilling characteristics, i.e. drilling through granite, sand or shale.

Using the modeling techniques described in the above-referenced U.S. Patent Application 2011/0220410, changes to the linear bit response according to the PDC bit model as a drilling operation advances within a reservoir from one formation having one set of characteristics to another formation having a different set of characteristics can be determined. As discussed hereinabove, the WOB, TOB and DOC space is determined. Real-time modeling of this data is challenging around formation boundaries or change points. Therefore, in an embodiment, a change point detector is used to determine the linear bit response and parameter values that may be derived therefrom. Using the change point detector, a straight line is fitted through the first set and a second straight line is fitted through the second set thereby avoiding polluting estimates for one formation with data collected from another, for example.

In embodiments of this disclosure, online data analysis may be provided by treating incoming data as being composed of segments between which are change points. The change points may be identified by the data analysis to provide for detection in changes in the automated industrial process.

In an embodiment of the present invention, the data may be analyzed in real-time to provide for real-time detection, rather than retrospective detection, of the change point. This real-time detection of the change point may be referred to as online analysis/detection. In an example embodiment, the data from one or more sensors may be fitted to an appropriate model and, from analysis of the incoming data with regard to the model, change points may be identified. By way of example, the model may be derived theoretically, from experimentation, and/or from analysis of previous operations.

As such, in accordance with one embodiment, data from an automated industrial process may be analyzed in an online process using change point modeling. The change point models divide a heterogeneous signal, which may represent data from one or more sources associated with a hydrocarbon related process, into a sequence of homogeneous segments. The discontinuities between segments are referred to as change points.

In accordance with embodiments of the present disclosure, it is postulated that the data streams are segmented according to a plurality of possible segments divided by change points each indicative of a change in operating condition. Evaluating each segment includes fitting the input stream data corresponding to each segment in the segmentation to a model for that segment and evaluating the segmentations by determining how well the models for the segments fit the input data corresponding to each segment of each segmentation. Using at least one of the most likely segmentations and the models corresponding to the segments thereof, a functional relationship between DOC and WOB is determined. A second functional relationship defining ROP as a function of RPM and WOB is determined along with the operating constraints defining the safe operating envelope. This can be rearranged to give ROP as a function of WOB and RPM, as shown by the contours in FIG. 5. Thus, for a given WOB-RPM pair a particular ROP may be expected. A cost function or surface based on WOB and RPM is then determined. The cost function is used to control the RPM and WOB in the drilling operation to minimize cost at any point along the trajectory of the wellbore.

Figure 5:
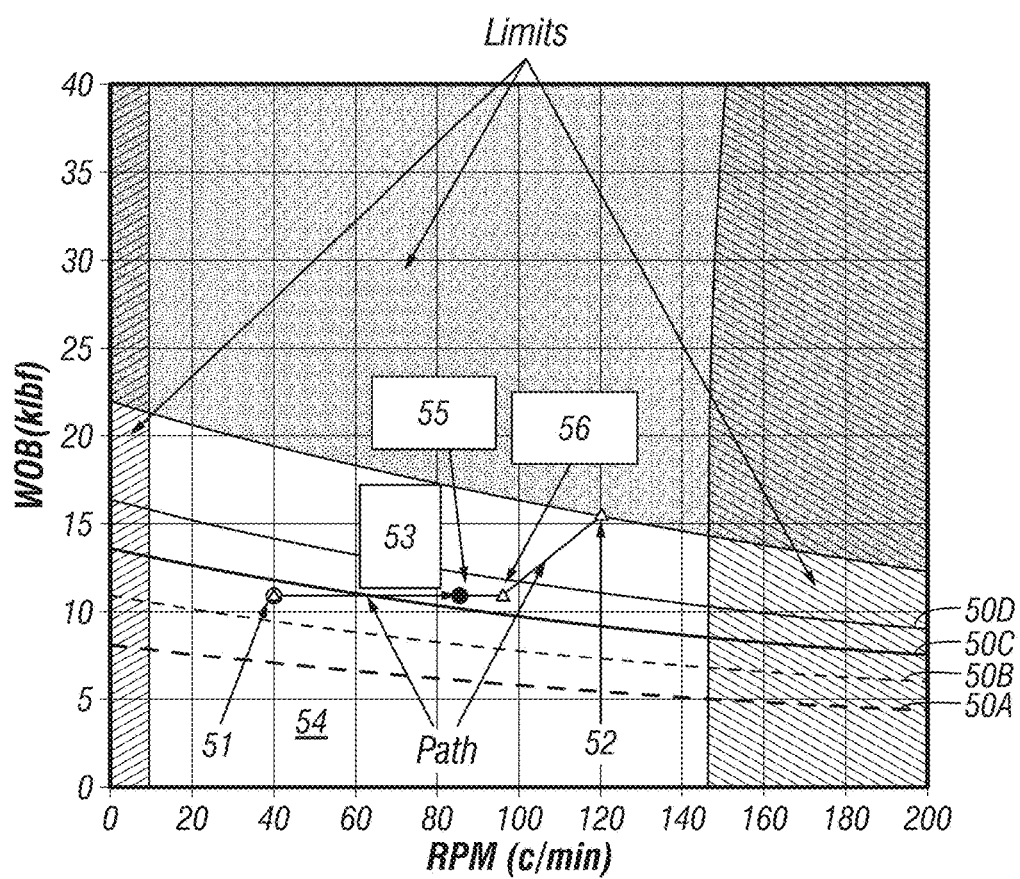
FIG. 5 is a graph illustrating the relationship between rate-of-penetration (ROP) as a function of WOB and RPM.

An example of proposed operating conditions in a drilling trajectory in weight on bit WOB (in kilopounds) vs. RPM space is shown in FIG. 5. In this example, lines 50A, 50B, 50C, and 50D represent constant ROP (feet/hour) values as a function of RPM and WOB. The white area represents the safe operating envelope 54, and the shaded areas represent the various limiters defined by the drilling equipment and/or the wellbore condition. The operating conditions in the white space 54 guide the driller/automation system without crossing any limit boundaries.

The safe operating envelope 54 is determined by combining a number of static and dynamic limit boundaries which may represent minimum or maximum values and can change based on the formations (current model fit for the drilling bit) or can be provided by an external program. Another type of limit is an area limit. It consists of a pair of minimums and maximums in the WOB/RPM space and defines no-go areas, i.e., areas to be avoided whilst moving about the safe operating envelope. An example of a no-go area is a zone of high shocks and vibrations. By way of example, the shaded area designated by reference number 53 in FIG. 5 may represent a no-go area within the safe operating envelope 54.

The coefficients of the bit/rock model allow various constraints shown in the shaded areas to the drilling process to be expressed as a function of WOB and RPM and superimposed in FIG. 5. Such limiting conditions include the ROP at which cuttings are being generated too fast to be cleaned from the annulus; the WOB that will generate excessive torque for the top drive; the WOB that will generate excessive torque for the drill pipe; the WOB that exceeds the drill bit specification for maximum weight on bit; and the RPM that causes excessive vibration of the derrick.

As noted above, the white area represents the safe operating envelope 54. Examination of the boundaries of safe operating envelope 54 reveals that the highest ROP within the safe operating envelope 54 may be found at point 52. It is expected that the WOB and RPM that generate the maximum ROP, i.e., point 52 in FIG. 5, within the safe operating envelope may be sought and communicated to the driller. The driller would ideally follow a straight line from point 51 to 52, to reach this maximum ROP. However, as can be seen in FIG. 5, doing so would cross a no-go area 53. Thus, determining the optimal path utilizes a combination of the cost function and a bias to move quickly to the optimal point. In this example, the path, as shown by the arrows in FIG. 5, from point 51, to point 55, to point 56, and then to point 52 represents the optimal path.

The illustrated path avoids the unsafe operating areas in the RPM vs. WOB analysis represented by FIG. 5 and also avoids no-go area 53 within the safe operating envelope 54. This includes expediently exiting the unsafe operating areas if the current condition exceeds the limits. It also provides for optimization of the ROP as one moves from point 51 through points 55 and 56 to point 52.

The embodiments shown herein are in terms of the two dimensional WOB v. RPM space, two of the parameters that the driller can directly control. However, it is understood that other embodiments can be expanded to include flow rate or other drilling control parameters to minimize drilling cost.

Figure 6:
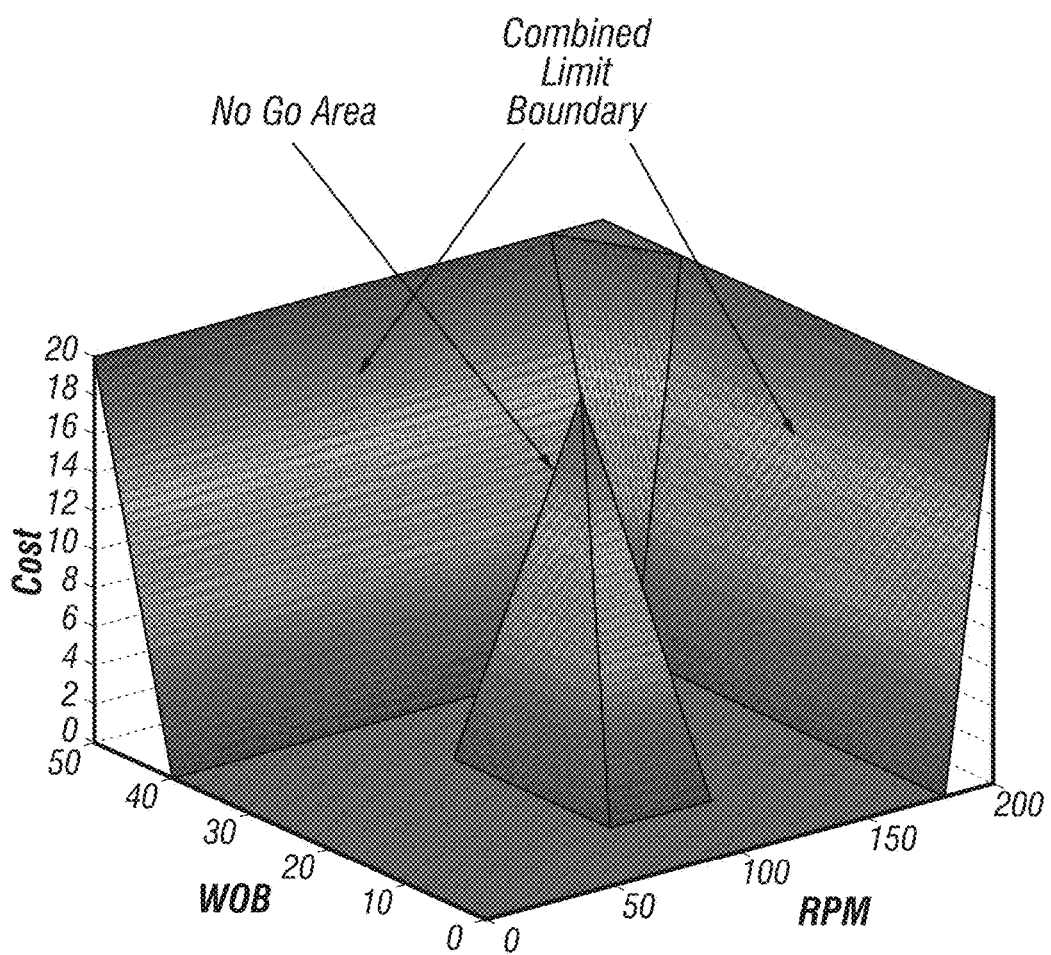
FIG. 6 is a 3D graph illustrating the relationship between cost of drilling as a function of WOB and RPM.
Figure 7:
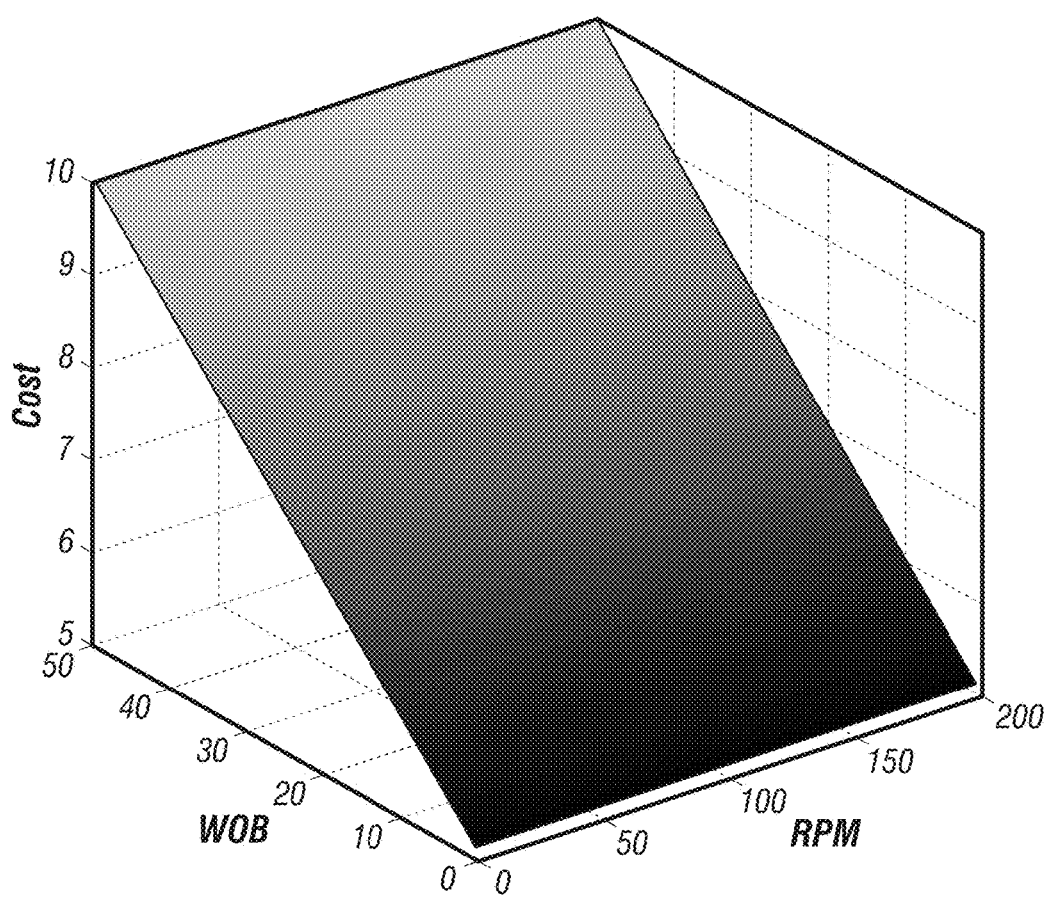
FIG. 7 is a 3D graph illustrating the cost of drilling as a function of WOB and RPM.

For drilling optimization, combined limit boundaries and no-go areas can be expressed as a cost function for the RPM v. WOB representation shown in FIG. 6. The combined limit boundary is shown in FIG. 6. The no-go area is also shown in FIG. 6. Thus, the operating constraints (RPM and WOB) of the drill in terms of WOB and RPM are bounded. The operating conditions for WOB and RPM will rarely exceed a limit boundary unless there are no other options. The next step is to determine the optimum cost for drilling. The cost function or surface is shown in FIG. 7 as a function of WOB and RPM. The cost relationship is very versatile, as a number of different and sometimes competing factors can be combined into the cost relationship and this makes it well suited to incorporating many aspects of the drilling operation. FIG. 7 is an example of translating a hard limit into a sharp increase in cost. In this way, if the driller exceeds a limit, the path will be highly biased to exit the limit quickly before continuing on to the optimal point. Determining the cost shape is a matter of combining the cost effects from different sources into one composite surface. In the cost function, linear cost functions were used; however, cost functions can be in the form of a complex surface with local maxima and minima. The applications of this are choosing a longer path that hits local optimal areas along the way thus improving the drilling performance and lower drilling cost during transition periods. An example would be hitting a local high ROP area whilst transitioning towards the optimal ROP. Further applications include biasing the operating parameters to avoid areas where equipment or conditions are less favorable but not so severe to be considered a limit. An example is maintaining a higher WOB during a transition when high trajectory build rates are desirable.

In addition to the limit boundaries described above, there are conditions present in drilling such as high shocks and vibrations which can occur in a specific zone of drilling parameters as shown in the three-dimensional graphical depiction of FIG. 7. It is straightforward to define the no-go area as a cost function for the operating conditions algorithm, wherein no-go areas (e.g., area 53 of FIG. 5) will be avoided when computing the optimum drilling conditions, e.g., WOB and RPM. While drilling, down hole sensors can directly measure shock and vibrations, these points can often be localized into a zone of high shocks and vibrations and thus determine a no-go area. The user can either manually draw a box around the shock points or the system can automatically generate the box to graphically identify a no-go area. Further, more complex shapes can be used to define the limits and no go areas shown in the example of FIGS. 5-6. The embodiments can equally handle complex curves and shapes such as an elliptical or oblique no-go area. That is, no-go areas are not necessarily limited to box-shaped areas (e.g., 53 in FIG. 5).

Figure 8:
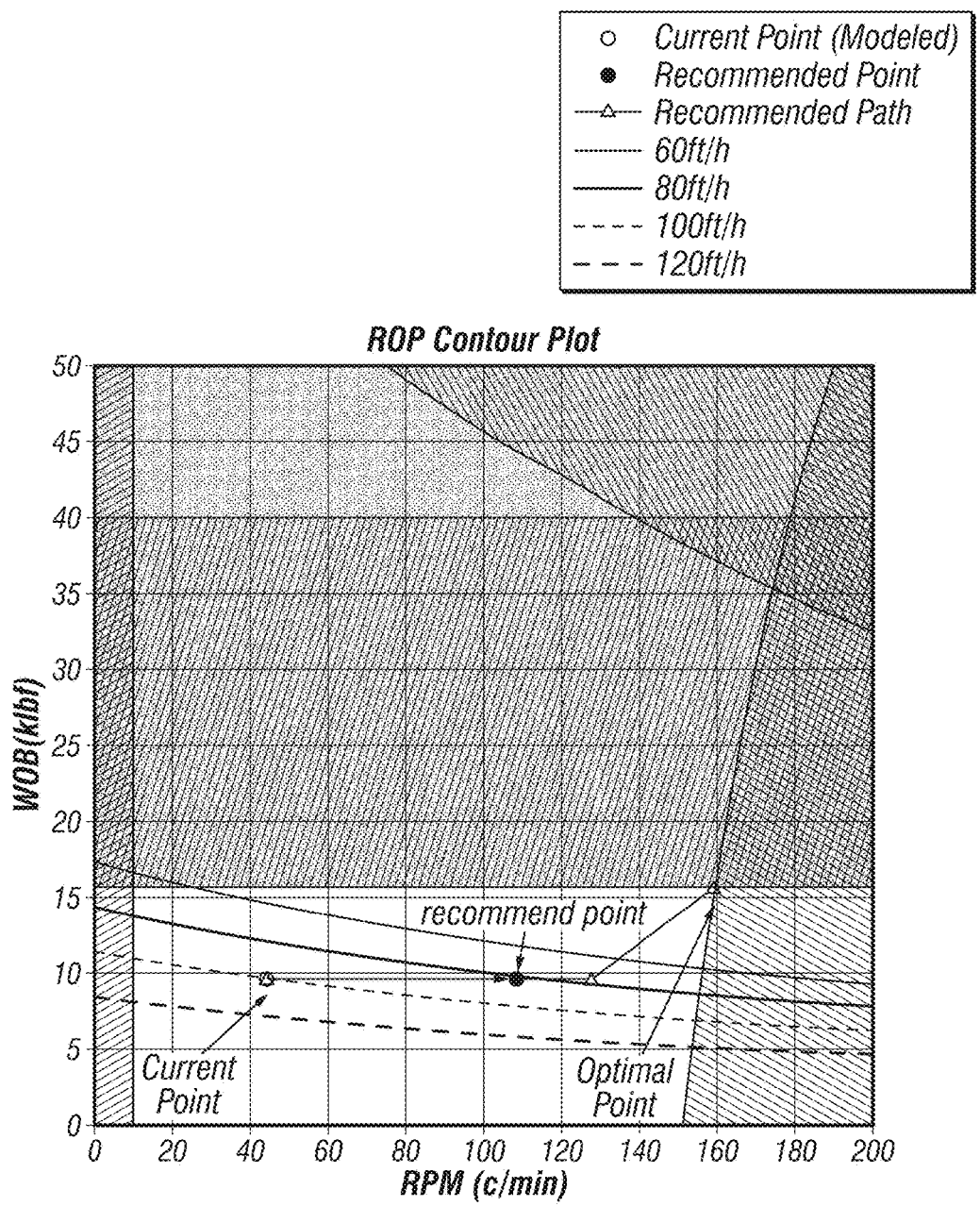
FIG. 8 is graph illustrating an embodiment of the present invention for changing drilling conditions to optimize drilling cost.
Figure 9:
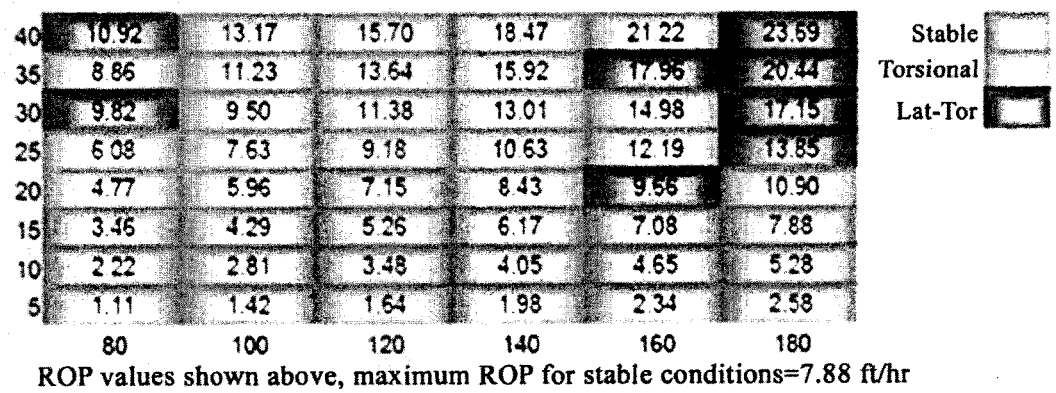
FIG. 9 is a table showing stable zones and undesirable zones with respect to certain drilling parameters.

Incorporating proper drilling practices to change drilling parameters during the drilling of the wellbore to minimize cost of drilling is accomplished. FIG. 8 shows an example of cost function where RPM is preferably increased rather than WOB. FIG. 9 provides a table that shows a finite element vibration analysis of a drill string indicating stable zones and areas that are less desirable. In the table of FIG. 9, the rows represent data corresponding different WOB values in the range of 5 to 40, and the columns represent data corresponding to different RPM values in the range of 80 to 180. As can be appreciated, computing the final cost function is a combination of choosing the components (limits, no-go areas, drilling response, stable zones, etc.), applying a scaling factor to the component(s) based on risks in a particular well/wellbore section, and then adding up the surfaces to form a composite surface. The optimization of drilling operating conditions at a point along the wellbore trajectory may help achieve the optimal (e.g., lowest) cost for drilling.

Figure 10:
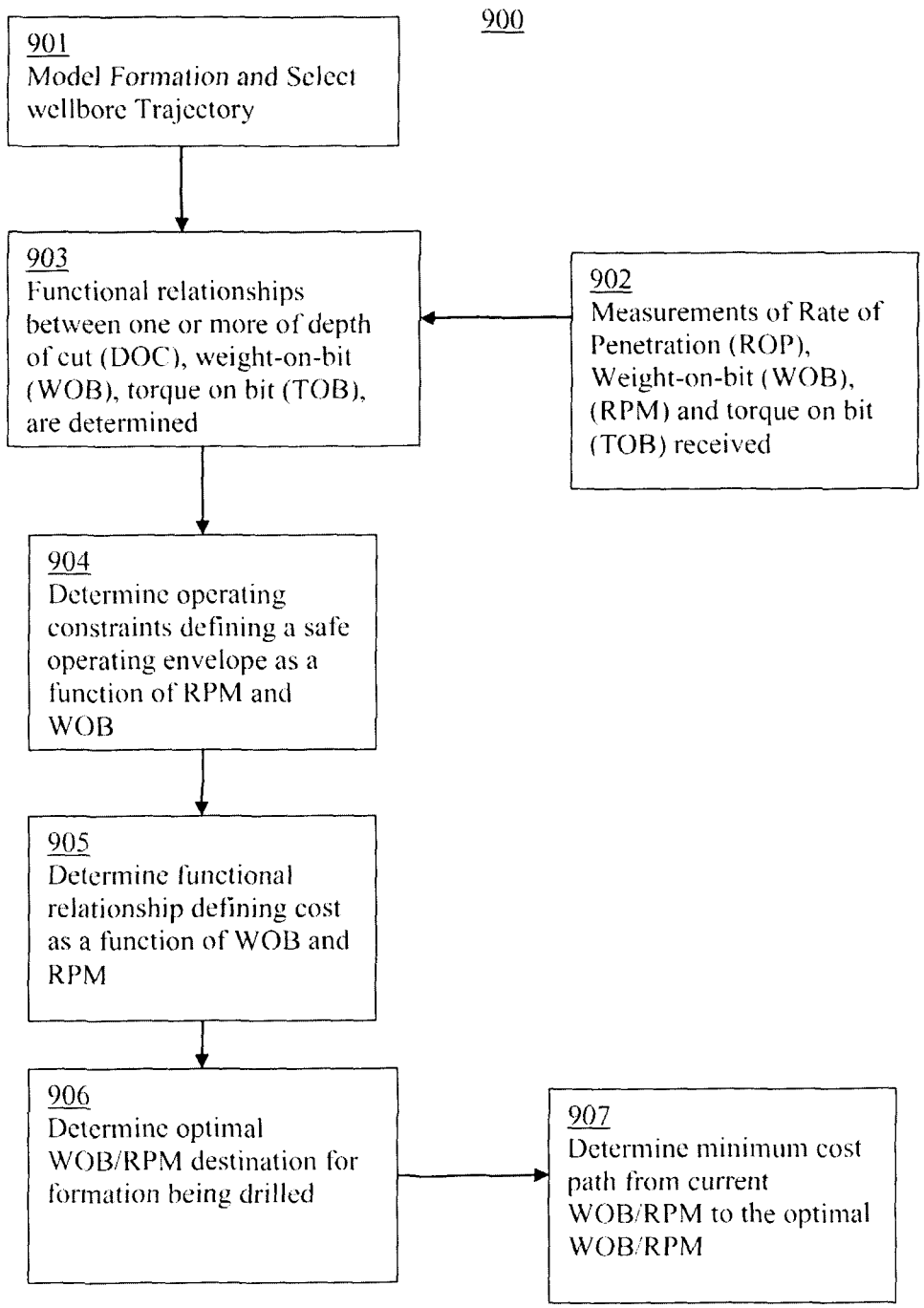
FIG. 10 is flow chart depicting a method for optimizing drilling cost according to one embodiment of the present disclosure.

FIG. 10 is a flow-chart illustrating an example embodiment of a drilling optimization process 900 to determine recommended parameters in drilling conditions at a point along the trajectory of the wellbore. First, the formation is modeled and a trajectory for the wellbore is selected as shown in 901. The operation continually updates as new drilling data is received in real-time in 902, where measurements indicative of rate of penetration (ROP), weight-on-bit (WOB) and drill-bit rotational speed (RPM) and torque on bit (TOB) at a position on the drilling trajectory are received. A first functional relationship between depth of cut (DOC), weight-on-bit (WOB), and torque on bit (TOB) is determined at the position on the drilling trajectory, as shown in 903. Operating constraints defining a safe operating envelope as a function of RPM and WOB are then determined in 904. A cost function (e.g., a second functional relationship) of drilling in relation to WOB and RPM is determined in 905. The cost function may encompass multiple desired drilling responses. Then, optimal values for WOB and RPM are determined in 906. Next, the minimum cost path from the current WOB/RPM parameters to the optimal WOB/RPM parameters, as determined in accordance with the cost function from 905, is determined at 907.

In certain embodiments, the drilling data is segmented using the change point detector, in the manner discussed herein above. The segmentation divides the data into homogenous segments and associates models to fit to the data in the segment. Thus, at a given time, there is a best segmentation. That best segmentation further has a current segment that corresponds to the most recently arrived drilling data. The data fit is performed in real-time thus adjusting the models to take the latest arrived data into account.

Having determined the desired segmentation and the models for the current segment, these models are used to determine the ROP contours corresponding to the PDC drill bit model fit to the data points in the current segment and the safe operating envelope corresponding to the drilling constraints corresponding to the current segment. A cost of drilling function that determines the cost of drilling at a point along the trajectory as a function of WOB and RPM is used with the ROP contours and safe operating envelope to determine the minimum operating cost within the safe operating envelope.

A mud motor or turbine is sometimes included with the bottom hole assembly 56 (FIG. 1) that converts hydraulic power from the mud into rotary mechanical power. With such an assembly, bit RPM is a function of surface RPM and mud flow rate, and consequently, the optimum ROP is a function of surface RPM, WOB and flow rate; the algorithm corresponding algorithm therefore suggests these three drilling parameters to the driller. The relationship between flow rate and the RPM of the shaft of the motor/turbine is established by experimentation and published by most vendors. Alternatively by measuring rotor speed down hole, this relationship may be inferred in real-time. Given either of these relationships, the algorithm above can be extended to give an equation of ROP as a function of surface RPM, WOB and flow rate.

Figure 11:
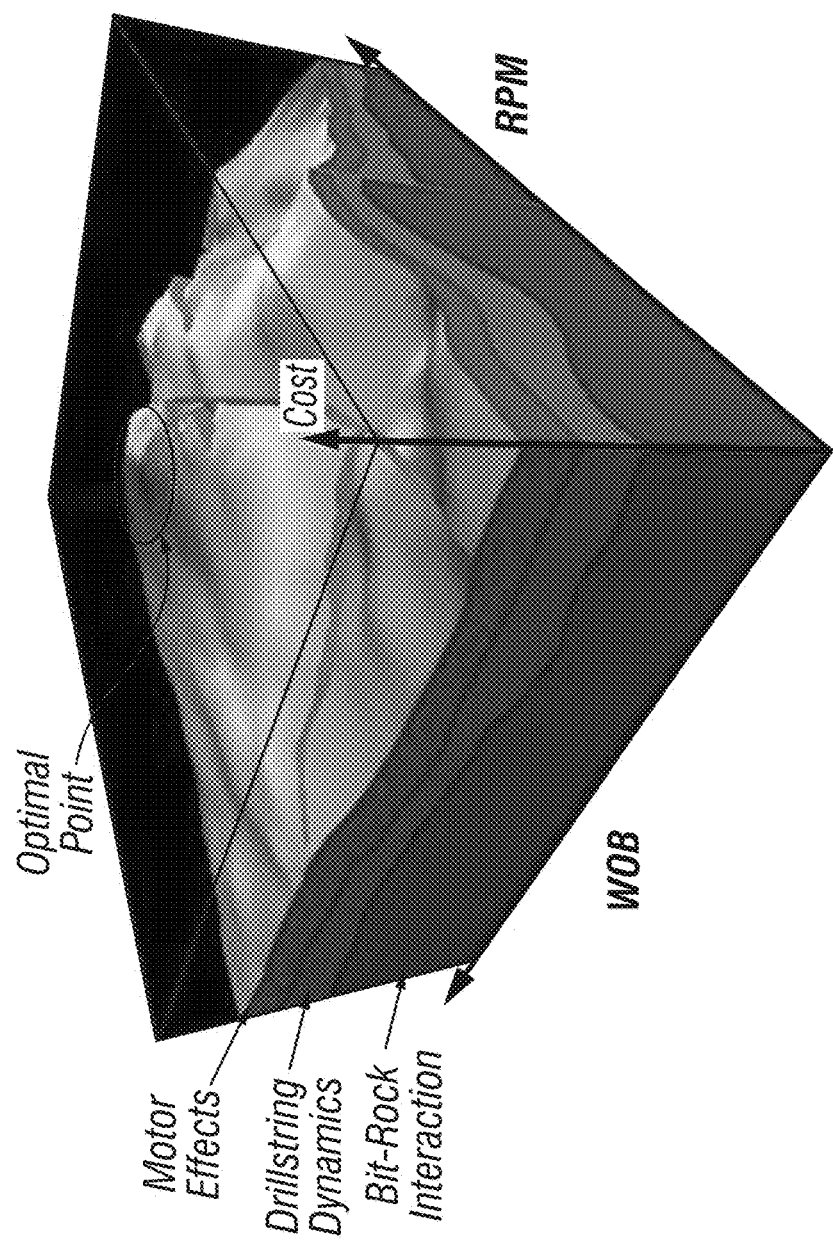
FIG. 11 is a 3D illustration showing a model of cost relationships in a drilling process, where independent inputs may be used to determine a desired output (e.g., ROP).

In accordance with a further aspect of the present disclosure, FIG. 11 shows a model of a cost relationship which is represented as layers or surfaces, and in which independent inputs (e.g., WOB, RPM, mud flow rate) may be used to determine an output, cost in this example. While, at first glance, the three-dimensional graph of FIG. 11 may have the appearance of an earth formation, this graph actually represents an aggregation of three surfaces, which may be representative of cost factors based on bit-rock interaction, drill string dynamics, and motor effects. As can be appreciated, drilling optimization involves taking into account a number of sometimes competing effects. For example, some factors to consider include models of the effects of the bit-rock interaction, which may be dependent on the formation being drilled, and models of the mechanical and hydraulic effects acting at the bit-rock interface. Additionally, models of the detrimental effects of drilling dynamics, shocks and vibrations may impact the instantaneous ROP or wear the bit prematurely and cause future sub-optimal ROP. If a down hole positive displacement mud motor is used, optimizing the flow rate and WOB to use the motor at its peak power will also influence the resulting ROP. All of these models can be represented as three-dimensional layers or surfaces, as shown in FIG. 11. Here, the independent inputs are those of WOB, RPM, and mud flow rate, and the output is the total cost, as shown in the figure, with the optimal drilling location circled. The circled point here may also represent optimal drilling conditions or optimal drilling parameters. Essentially, the main idea is that multiple cost surfaces can be combined into a composite cost and the optimal point for a given parameter is the peak of the composite surface.

The above-described technology for optimizing cost of drilling is applicable to other structures and parameters. In one alternative embodiment the technique is applied to roller cone bits using appropriate models for modeling the drilling response of a roller cone bit. In yet further alternative embodiments, the above-described mechanisms are applied to drilling processes that include additional cutting structures to the bit, such as reamers, under-reamers or hole openers by including a down hole measurement of WOB and torque behind the drill bit. In one alternative to that embodiment, a second set of measurements behind the additional cutting structure is included. In a further alternative embodiment, a bit wear model could be added to allow the bit run to reach the casing point without tripping for a new bit.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for optimizing a drilling apparatus comprising:
  using a processing system to:
    model a formation;
    select a drilling trajectory in the formation;
    receive measurements indicative of rate of penetration (ROP), revolutions per minute (RPM), weight-on-bit (WOB) and torque-on-bit (TOB) of a drilling string at a position on the selected drilling trajectory in the formation;
    determine a first functional relationship between depth-of-cut (DOC), WOB, and TOB for the modeled formation;
    determine operating constraints defining a safe operating envelope as a function of RPM and WOB along the selected drilling trajectory;
    determine a second functional relationship that defines a cost relationship as a function of RPM and WOB along the selected drilling trajectory;

determine an optimal RPM and an optimal WOB based on the operating constraints and the cost relationship;

determine a path from a current RPM and a current WOB to the optimal RPM and optimal WOB based upon the operating constraints and the cost relationship, wherein determining the path comprises:

identifying a no-go area within the safe operating envelope, the no-go area comprising a range of RPM and WOB values between the current RPM and current WOB and the determined optimal RPM and optimal WOB; and defining the path such that the path avoids the no-go area; and control a drill string of the drilling apparatus by adjusting RPM to the optimal RPM and adjusting WOB to the optimal WOB along the determined path.

2. The method of claim 1 wherein the safe operating envelope excludes the no-go area based on the formation model.

3. The method of claim 2 wherein the safe operating envelope excludes the no-go area based on received measurements of shocks and vibrations while drilling.

4. The method of claim 1, wherein the first functional relationship between DOC, WOB, and TOB at the position on the drilling trajectory in the modeled formation comprises using a processing system to: obtain a plurality of segmentations by segmenting measurements according to a plurality of possible segments divided by change points each indicative of a change in an operating condition; for each segmentation, evaluate each of the segments by fitting input stream data corresponding to each segment to a model corresponding to each segment; for each segmentation, evaluate how well the model for each respective segment fits input data corresponding to each segment; and select at least one of the segmentations and the models corresponding to the segments of the selected segmentation(s) to determine a functional relationship between DOC, WOB, and TOB.

5. The method of claim 1 wherein the drilling string comprises a mud motor.

6. The method of claim 5, further comprising using the processing system to: receive measurements indicative of a flow rate in the mud motor at the position on the drilling trajectory; determine a third functional relationship defining cost of drilling as a function of RPM, WOB and flow rate; and adjust RPM, WOB and flow rate at the position on the drilling trajectory to minimize the cost of drilling based on the third functional relationship.

7. A computer program product, comprising a non-transitory computer readable medium having a computer readable program code embodied therein, said computer readable program code containing instructions that, when executed by a computer, cause execution of the following steps:

model a formation;

select a drilling trajectory in the formation;

receive measurements indicative of rate of penetration (ROP), revolutions per minute (RPM), weight-on-bit (WOB) and torque-on-bit (TOB) of a drilling string at a position on the selected drilling trajectory in the formation;

determine a functional relationship between depth-of-cut (DOC), WOB, and TOB for the modeled formation;

determine operating constraints defining a safe operating envelope as a function of RPM and WOB along the selected drilling trajectory;

determine a functional relationship that defines a cost relationship as a function of RPM and WOB along the selected drilling trajectory;

determine an optimal RPM and an optimal WOB based on the operating constraints and the cost relationship;

determine a path from a current RPM and a current WOB to the optimal RPM and optimal WOB based upon the cost relationship, wherein determining the path comprises:

identifying a no-go area within the safe operating envelope, the no-go area comprising a range of RPM and WOB values between the current RPM and current WOB and the determined optimal RPM and optimal WOB; and defining the path such that the path avoids the no-go area; and control the drilling apparatus by adjusting RPM to the optimal RPM and adjusting WOB to the optimal WOB along the determined path.

8. The computer program product of claim 7, wherein the safe operating envelope excludes the no-go area based on the formation model.

9. The computer program product of claim 7, wherein the safe operating envelope excludes the no-go area based on received measurements of shocks and vibrations while drilling.

10. The computer program product of claim 7, wherein determining the functional relationship between DOC, WOB, and TOB at the position on the drilling trajectory in the modeled formation comprises: obtain a plurality of segmentations by segmenting measurements according to a plurality of possible segments divided by change points each indicative of a change in an operating condition; for each segmentation, evaluate each of the segments by fitting input stream data corresponding to each segment to a model corresponding to each segment; for each segmentation, evaluate how well the model for each respective segment fits input data corresponding to each segment; and select at least one of the segmentations and the models corresponding to the segments of the selected segmentation(s) to determine a functional relationship between DOC, WOB, and TOB.

11. The computer program product of claim 7, wherein the drilling string comprises a mud motor.

12. The computer program product of claim 11, further comprising: receive measurements indicative of a flow rate in the mud motor at the position on the drilling trajectory; determine a functional relationship defining cost of drilling as a function of RPM, WOB and flow rate; and adjust RPM, WOB and flow rate at the position on the drilling trajectory to minimize the cost of drilling based on the functional relationship defining the cost of drilling as a function of RPM, WOB, and flow rate.

13. A drilling control apparatus, comprising:

a system for modeling a formation and selecting a drilling trajectory in the formation; a plurality of sensors that acquire measurements of depth-of-cut (DOC), revolutions per minute (RPM), weight-on-bit (WOB) and torque-on-bit (TOB) of a drilling string at a position on the drilling trajectory;

a processor; and a memory including one or more non-transitory computer-readable media storing instructions that, when executed by the processor, cause the system to perform operations, the operations comprising:

determining a first functional relationship between depth of cut (DOC), weight-on-bit (WOB), and torque-on-bit (TOB) for the modeled formation;

determining operating constraints defining a safe operating envelope as a function of RPM and WOB along the selected drilling trajectory;

determining a second functional relationship that defines a cost relationship as a function of RPM and WOB along the selected drilling trajectory;

determining an optimal RPM and an optimal WOB based on the operating constraints and the cost relationship, determining a path from a current RPM and a current WOB to the optimal RPM and optimal WOB based upon the second functional relationship, wherein determining the path comprises:

identifying a no-go area within the safe operating envelope, the no-go area comprising a range of RPM and WOB values between the current RPM and current WOB and the determined optimal RPM and optimal WOB; and defining the path such that the path avoids the no-go area; and adjusting the RPM and WOB of the drill string to the optimal RPM and optimal WOB to minimize the cost of drilling at the position on the drilling trajectory.

14. The drilling control apparatus of claim 13, wherein the safe operating envelope excludes the no-go area based on the formation model.

15. The drilling control apparatus of claim 13, wherein the safe operating envelope excludes the no-go area based on ROP at which cuttings are generated too fast to be cleaned from an annulus.

16. The drilling control apparatus of claim 13, wherein the safe operating envelope excludes the no-go area based on WOB that will generate excessive torque in the drill string.

17. The drilling control apparatus of claim 13, wherein the safe operating envelope excludes the no-go area based on received measurements from sensors measuring shocks and vibrations while drilling.

18. The drilling control apparatus of claim 13, wherein determining the first functional relationship between DOC, WOB and TOB at the position on the drilling trajectory in the modeled formation comprises: obtaining a plurality of segmentations by segmenting measurements according to a plurality of possible segments divided by change points each indicative of a change in an operating condition; for each segmentation, evaluating each of the segments by fitting input stream data corresponding to each segment to a model corresponding to each segment; for each segmentation, evaluating how well the model for each respective segment fits input data corresponding to each segment; and selecting at least one of the segmentations and the models corresponding to the segments of the selected segmentation(s) to determine a functional relationship between DOC, WOB and TOB.

19. The drilling control apparatus of claim 13, wherein the drilling string comprises a mud motor.

20. The drilling control apparatus of claim 19, further comprising: a sensor measuring a flow rate in the mud motor at the position on the drilling trajectory; wherein the processor determines a third functional relationship defining cost of drilling as a function of RPM, WOB and flow rate; and adjusting RPM, WOB and flow rate at the position on the drilling trajectory to minimize the cost of drilling based on the third functional relationship.

* * * * *